(12) United States Patent
Lee

(10) Patent No.: US 9,921,133 B2
(45) Date of Patent: Mar. 20, 2018

(54) TREAD DEPTH MEASURING SYSTEM

(71) Applicant: HON HAI PRECISION INDUSTRY CO., LTD., New Taipei (TW)

(72) Inventor: Chia-Yen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 343 days.

(21) Appl. No.: 14/812,673

(22) Filed: Jul. 29, 2015

(65) Prior Publication Data

US 2017/0030806 A1    Feb. 2, 2017

(51) Int. Cl.
*B60C 23/00*    (2006.01)
*G01M 17/02*    (2006.01)
*G01B 11/22*    (2006.01)
*B60C 11/24*    (2006.01)

(52) U.S. Cl.
CPC ........... *G01M 17/02* (2013.01); *B60C 11/246* (2013.01); *G01B 11/22* (2013.01)

(58) Field of Classification Search
CPC ..... B60C 11/246; B60C 11/243; B60C 11/24; G01B 11/22; G01M 17/02
USPC ............................ 340/442, 468, 438; 73/49
See application file for complete search history.

(56) References Cited

U.S. PATENT DOCUMENTS

| | | | | |
|---|---|---|---|---|
| 4,067,235 A | * | 1/1978 | Markland | B60C 23/007 340/447 |
| 9,476,801 B2 | * | 10/2016 | Uffenkamp | G01M 17/027 |
| 2009/0000370 A1 | * | 1/2009 | Lionetti | G01B 11/22 73/146 |
| 2015/0330773 A1 | * | 11/2015 | Uffenkamp | G01B 11/22 356/631 |
| 2016/0121671 A1 | * | 5/2016 | Neau | G06T 17/00 703/6 |
| 2016/0258842 A1 | * | 9/2016 | Taylor | G01B 11/22 |
| 2017/0124784 A1 | * | 5/2017 | Wittmann | G07C 5/0808 |

FOREIGN PATENT DOCUMENTS

| | | |
|---|---|---|
| CN | 1061756 C | 2/2001 |
| TW | M477958 U | 5/2014 |
| TW | M497599 U | 3/2015 |
| TW | 201527141 A | 7/2015 |

* cited by examiner

*Primary Examiner* — Toan N Pham
(74) *Attorney, Agent, or Firm* — ScienBiziP, P.C.

(57) ABSTRACT

An tread depth measuring system includes a tread measuring apparatus, a processor, a supporter, and a warning apparatus. The tread measuring apparatus is positioned on the ground and configured to measure a tread depth. The processor is coupled to the tread measuring apparatus and configured to compare the tread depth measured by the tread measuring apparatus with a preset critical depth. The supporter stands on the ground. The warning apparatus is supported by the supporter and coupled to the processor. When the tread depth measured by the tread measuring apparatus is less than the preset critical depth, the processor sends a control signal to actuate the warning apparatus.

17 Claims, 4 Drawing Sheets

TREAD DEPTH MEASURING SYSTEM

FIELD

The subject matter herein generally relates to tread depth measuring systems, and particularly to a tread depth measuring system having warning apparatus.

BACKGROUND

Cars are important means of transportation nowadays. Tread are provided on a tire of a car and play an important role for driving safety. Such as the tread may increase braking force and/or driving force, avoid sliding, or may drain water and keep grip ability and so on. Shallow tread may cause traffic hazards and even lead to major accidents.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
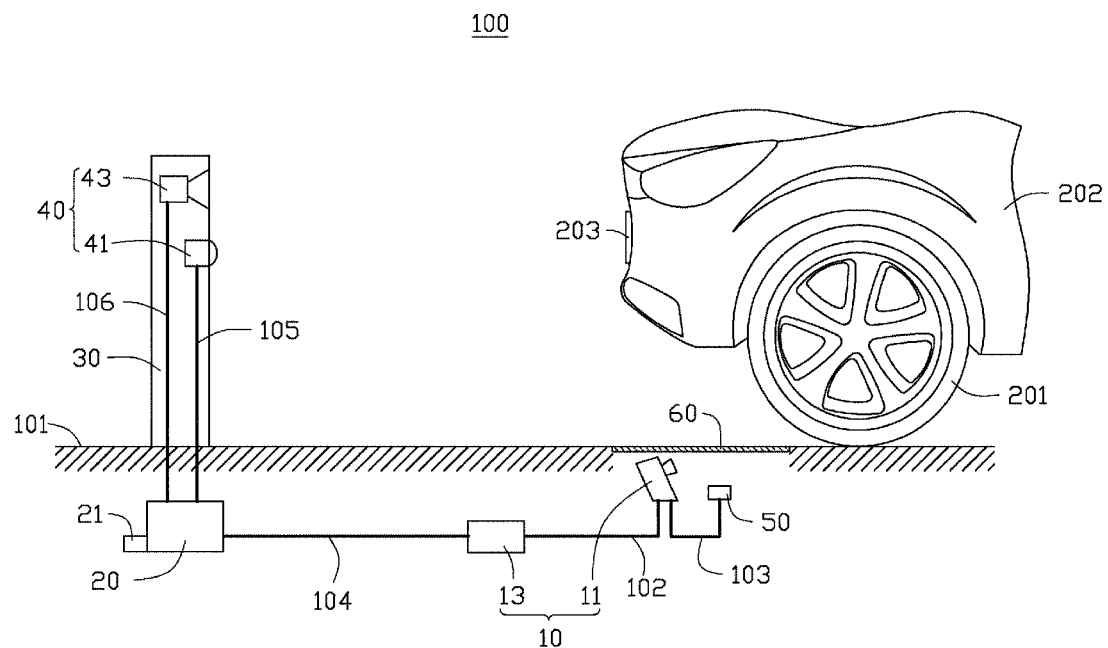
FIG. 1 is a side view of a tread depth measuring system, in a first configuration, according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the configurations described herein. However, it will be understood by those of ordinary skill in the art that the configurations described herein can be practiced without these specific details. In other instances, methods, procedures, and components have not been described in detail so as not to obscure the related relevant feature being described. Also, the description is not to be considered as limiting the scope of the configurations described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A tread depth measuring system is described herein. The tread depth measuring system can include a tread measuring apparatus, a processor, a memory, a supporter, and a warning apparatus. The tread measuring apparatus can be positioned on the ground and configured to measure a tread depth. The memory can be electrically coupled to the processor and can pre-store a preset critical depth. The processor can be coupled to the tread measuring apparatus and configured to compare the tread depth measured by the tread measuring apparatus with the preset critical depth. The supporter can stand on the ground. The warning apparatus can be supported by the supporter and coupled to the processor. When the tread depth measured by the tread measuring apparatus is less than the preset critical depth, the processor sends a control signal to actuate the warning apparatus.

A tread depth measuring system is described herein. The tread depth measuring system can include a support table, a three-dimensional camera, a three-dimensional graphics processor, a processor, a memory, a supporter, and a warning apparatus. The support table can include a first ramp, a support portion, and a second ramp. The support portion can define a cavity. The first ramp and the second ramp can be positioned at opposite sides of the support portion. The three-dimensional camera can be received in the cavity. The three-dimensional graphics processor can be received in the cavity and coupled to the three-dimensional camera. The memory can be received in the cavity and can be electrically coupled to the processor. The memory can pre-store a preset critical depth. The processor can be received in the cavity and coupled to the three-dimensional graphics processor. The processor can be configured to compare the tread depth measured by the three-dimensional camera with the preset critical depth. The supporter can stand on the ground. The warning apparatus can be supported by the supporter and coupled to the processor. When the tread depth measured by the tread measuring apparatus is less than the preset critical depth, the processor sends a control signal to actuate the warning apparatus.

FIG. 1 illustrates a tread depth measuring system 100 in a first configuration. The tread depth measuring system 100 can include a tread measuring apparatus 10, a processor 20, a memory 21 electrically coupled to the processor 20, a supporter 30, and a warning apparatus 40. The tread measuring apparatus 10 can be positioned on the ground 101 and configured to measure a tread depth of a tire 201 of a car 202 when the car 202 reaches or near the tread measuring apparatus 10. The memory 21 can pre-store a preset critical depth. The processor 20 can be coupled to the tread measuring apparatus 10 and configured to compare the tread depth measured by the tread measuring apparatus 10 with a value of the preset critical depth. The supporter 30 can stand on the ground. The warning apparatus 40 can be supported by the supporter 30 and coupled to the processor 20. When the tread depth measured by the tread measuring apparatus 10 is less than the preset critical depth, the processor 20 can send a control signal to actuate the warning apparatus 40.

The tread measuring apparatus 10 can include a three-dimensional camera 11 and a three-dimensional graphics processor 13 coupled to the three-dimensional camera 11. The three-dimensional camera 11 and the three-dimensional graphics processor 13 are separated members. The three-dimensional graphics processor 13 is configured to analyze the tread depth from an image taken by the three-dimensional camera 11. The three-dimensional graphics processor 13 can be coupled to the three-dimensional camera 11 by at least one optical cable or at least one electrical cable. In the illustrated configuration, the three-dimensional graphics processor 13 is coupled to the three-dimensional camera 11 by an electrical cable 102.

The three-dimensional camera 11 can be embedded in the ground 101 for taking pictures to tires passing a specific location. The three-dimensional camera 11 can be equipped with a flashlight to fill light when taking pictures. The three-dimensional graphics processor 13 can be embedded in the ground. In an alternative configuration, the three-dimensional camera 11 and the three-dimensional graphics processor 13 can be integrated into one piece. A protective cover 60 can be positioned on the ground and cover the tread measuring apparatus 10 to protect the tread measuring apparatus 10. For in sake of measuring tread depths, the protective cover 60 should be transparent.

The tread depth measuring system 100 can further include a sensor 50 coupled to the tread measuring apparatus 10. The sensor 50 can be positioned on the ground and covered by the protective cover 60. The sensor 50 configured to sense a distance between the sensor 50 and a tire of a car moving towards the sensor 50. A preset distance can be pre-stored in the sensor 50. When the distance sensed by the sensor 50 is less than the preset distance, the sensor 50 can actuate the three-dimensional camera 11 to take a photo of the tire in the specific location. The sensor 50 can be coupled to the three-dimensional camera 11 by at least one optical cable or at least one electrical cable. In the illustrated configuration, the sensor 50 is coupled to the three-dimensional camera 11 by an electrical cable 103.

In at least one configuration, the processor 20 can be a central processing unit, a digital processor, or a single chip, for example. The processor 20 can be coupled to the three-dimensional graphics processor 13 by at least one optical cable or at least one electrical cable. In the illustrated configuration, the processor 20 is electrically coupled to the three-dimensional graphics processor 13 by an electrical cable 104. The memory 21 can be an internal storage system, such as a flash memory, and/or a read-memory (ROM) for permanent storage of information.

The warning apparatus 40 can include a signal light 41 supported by the supporter 30 and coupled to the processor 20. The signal light 41 can be coupled to the processor 20 by at least one optical cable or at least one electrical cable. In the illustrated configuration, the signal light 41 is electrically coupled to the processor 20 by an electrical cable 105.

When the tread depth measured by the tread measuring apparatus 10 is less than the preset critical depth, the processor 20 can send a control signal to actuate the signal light to turn red. The processor 20 can further pre-store a preset reference depth. The processor 20 can be further configured to compare the tread depth measured by the tread measuring apparatus 10 with a value of the preset reference depth. When the tread depth measured by the tread measuring apparatus 10 is larger than the preset reference depth, the processor 20 can send a control signal to actuate the signal light 41 to turn green. When the tread depth measured by the tread measuring apparatus 10 is larger than the preset critical depth and less than the preset reference depth, the processor 20 can send a control signal to actuate the signal light 41 to turn yellow. Taiwanese traffic rules prescribes a tire depth is needed at least 1.6 mm. In the illustrated configuration, the preset critical depth is 1.6 mm and the preset reference depth is 1.9 mm. Thus, when the signal light 41 turns red, the measured tire of the car is needed to be changed. When the signal light 41 turns yellow, a tread depth of the measured tire is approximate the preset critical depth. When the signal light 41 turns green, a tread depth of the measured tire of the car is larger than 1.9 mm.

The warning apparatus 40 can further include a camera 43 supported by the supporter 30 and coupled to the processor 20. The camera 43 can be coupled to the processor 20 by at least one optical cable or at least one electrical cable. In the illustrated configuration, the camera 43 is electrically coupled to the processor 20 by an electrical cable 106. When the tread depth measured by the tread measuring apparatus 10 is less than the preset critical depth, the processor 20 controls the camera 43 to take a picture of a license plate 203 of the measured car 202.

Figure 2:
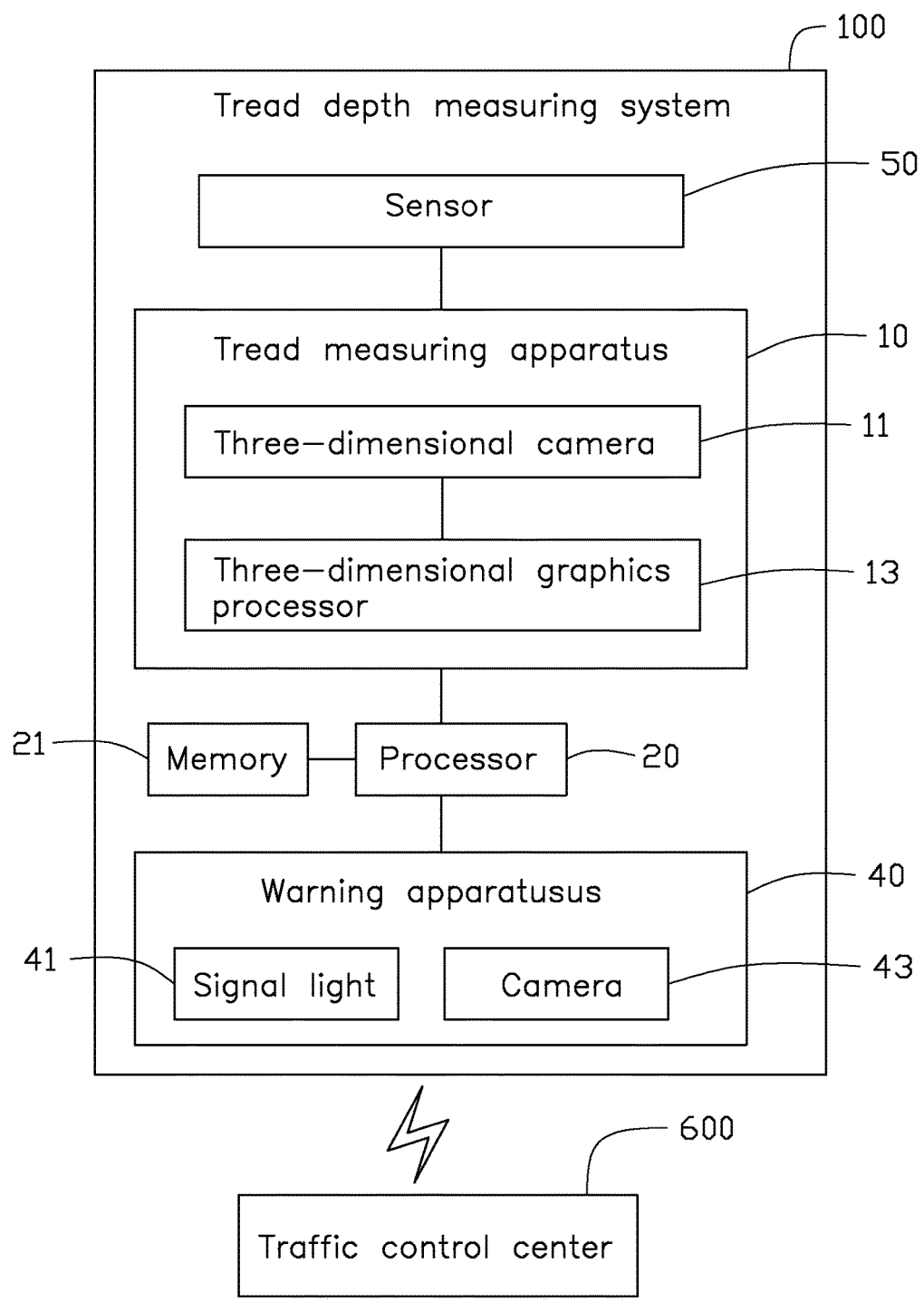
FIG. 2 is a block diagram of the tread depth measuring system of FIG. 1.

FIG. 2 illustrates that the camera 43 can be equipped with a signal sender and configured to send the picture of the license plate 203 to a traffic control center 600. Thus, the owner of the car can be advised to recheck the tire of the car or even be noticed to pay fines. In the illustrated configuration, the camera 43 can be a digital camera.

Figure 3:
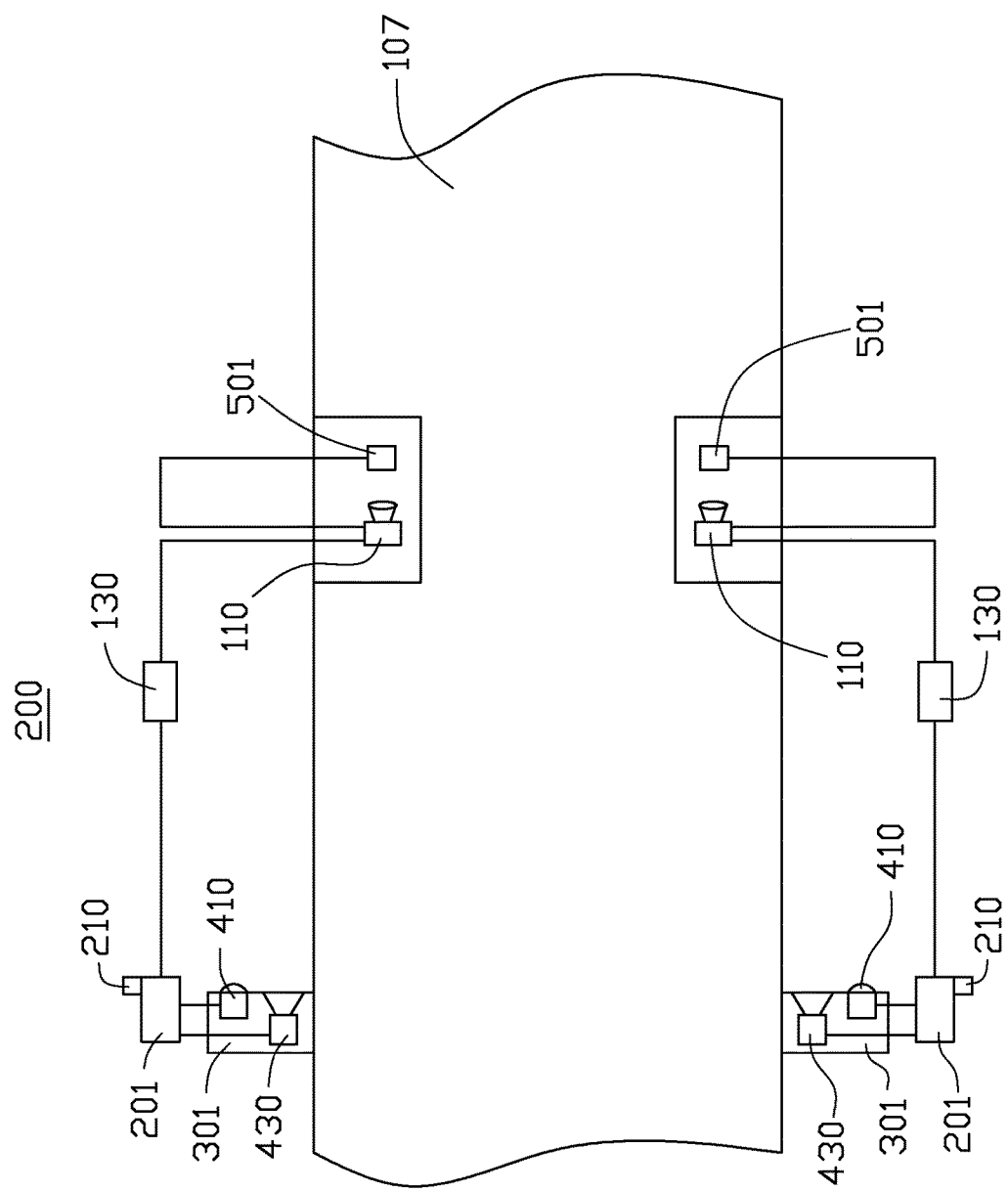
FIG. 3 is a top view of a tread depth measuring system, in a second configuration.

FIG. 3 illustrates a tread depth measuring system 200 in a second configuration. The tread depth measuring system 200 can be similar to the tread depth measuring system 100 in the first configuration. Differences between the tread depth measuring system 200 and the tread depth measuring system 100 is that the tread depth measuring system 200 can include at least a pair of the tread depth measuring systems 100. In this configuration, the tread depth measuring system 200 can include two three-dimensional cameras 110, two three-dimensional graphics processors 130, two sensors 501, two processors 201, two memories 210, two supporters 301, two signal lights 410, and two cameras 430. The two supporters 301 can stand on the ground and positioned at opposite sides of a road 107. One of the signal lights 410 and one of the cameras 430 are supported by one of the supporters 301. Another one of the signal lights 410 and another one of the cameras 430 are supported by another one of the supporters 301. Each memory 210 can be electrically coupled to one of the processors 201. Each processor 201 can be coupled to one of the signal lights 410 and one of the cameras 430. The three-dimensional cameras 110 can be positioned on the road 107 and separate in a distance substantially equals to a distance of two tires of a car. Each three-dimensional graphics processor 130 and each sensor 501 can be respectively coupled to one of the three-dimensional cameras 110. Therefore, when a car drives towards the three-dimensional cameras 110, two front tires or two rear tires can be substantially simultaneously measured by the two three-dimensional cameras 110.

Figure 4:
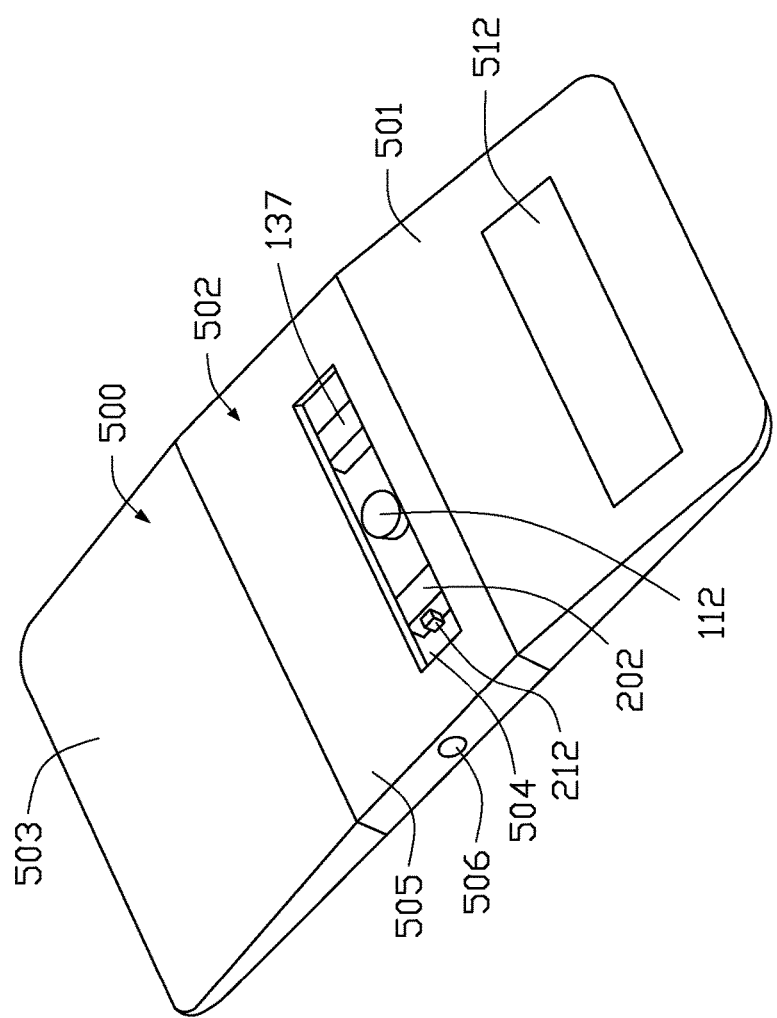
FIG. 4 is a partial, isometric view of a tread depth measuring system, in a third configuration.

FIG. 4 illustrates the tread depth measuring system in a third configuration. The tread measuring apparatus, the processor, and the sensor are not limited to be positioned on the ground as the first and second configuration. A three-dimensional camera 112, a three-dimensional graphics processor 137, a processor 202, and a sensor 512 can be positioned on a support table 500. A memory 212 can be attached to the processor 202 and electrically coupled to the processor 202. The support table 500 can be put on the ground or detachably fixed on the ground.

The support table 500 can be substantially trapezoidal and can include a first ramp 501, a support portion 502, and a second ramp 503. The first ramp 501 and the second ramp 503 can be positioned at opposite sides of the support portion 502. The support portion 502 can define a cavity 504 at a top surface 505 of the support portion 502. The three-dimensional camera 112, the three-dimensional graphics processor 137, and the processor 202, and the memory 212 can be received in the cavity 504. The three-dimensional graphics processor 137 and the processor 202 can be respectively electrically coupled to the three-dimensional cameras 112. The support table 500 can further define a hole 506 at a sidewall. The hole 506 can be in communication with the cavity 504, and configured for passing cables coupling the processor 202 and a warning apparatus.

The sensor 512 can be positioned on the first ramp 501 and electrically coupled to the three-dimensional camera 112. A car can move to the top surface 505 of the support portion 502 from the first ramp 501 and move away from the second ramp 503. When the sensor 512 senses a tire of a car, the sensor 512 can trigger the three-dimensional camera 11 to take a picture of the tire. The support table 500 can be used outdoor, such as positioned on a road, or used indoor, such as used in a vehicle maintenance shop or an auto mall.

In at least one configuration, the tread measuring apparatus 10 can be not limited to the structures as the first or second or third configuration. The tread measuring apparatus 10 can be replaced by other types of tread measuring apparatus 10, such as a tread measuring apparatus using laser.

The configurations shown and described above are only examples. Many details are often found in the art such as the other features of a tread depth measuring system. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the configurations described above may be modified within the scope of the claims.

What is claimed is:

1. A tread depth measuring system comprising:
   a tread measuring apparatus positioned on ground and configured to measure a tread depth, the tread measuring apparatus comprising a three-dimensional camera and a three-dimensional graphics processor coupled to the three-dimensional camera, the three-dimensional graphics processor being configured to analyze the tread depth from a picture taken by the three-dimensional camera;
   a memory pre-storing a preset critical depth;
   a processor coupled to the tread measuring apparatus and the memory, and configured to compare the tread depth measured by the tread measuring apparatus with the preset critical depth;
   a supporter standing on the ground;
   a warning apparatus supported by the supporter and coupled to the processor, and
   a sensor positioned on the ground and coupled to the tread measuring apparatus, the sensor being configured to sense a distance between the sensor and a tire of a car moving towards the sensor, and actuate the three-dimensional camera when the distance sensed by the sensor is less than a preset distance;
   wherein, when the tread depth measured by the tread measuring apparatus is less than the preset critical depth, the processor sends a first control signal to actuate the warning apparatus.

2. The tread depth measuring system of claim 1, wherein the warning apparatus comprises a signal light coupled to the supporter, when the tread depth measured by the tread measuring apparatus is less than the preset critical depth, the processor sends the first control signal to actuate the signal light.

3. The tread depth measuring system of claim 2, wherein when the tread depth measured by the tread measuring apparatus is less than the preset critical depth, the signal light turns red, and the preset critical depth is 1.6 mm.

4. The tread depth measuring system of claim 1, wherein the warning apparatus comprises a signal light coupled to supporter, the memory pre-stores a preset reference depth, the processor is further configured to compare the tread depth measured by the tread measuring apparatus with the preset reference depth, when the tread depth measured by the tread measuring apparatus is larger than the preset reference depth, the processor sends a second control signal to actuate the signal light to turn green; when the tread depth measured by the tread measuring apparatus is larger than the preset critical depth and less than the preset reference depth, the processor sends a third control signal to actuate the signal light to turn yellow.

5. The tread depth measuring system of claim 4, wherein the preset reference depth is 1.9 mm.

6. The tread depth measuring system of claim 1, wherein the warning apparatus comprises a camera supported by the supporter, when the tread depth measured by the tread measuring apparatus is less than the preset critical depth, the processor controls the camera to take a picture of a license plate of a measured car, the camera is configured to send the picture of the license plate to a traffic control center.

7. The tread depth measuring system of claim 1, wherein the tread depth measuring system further comprises a protective cover positioned on the ground, and the protective cover covers the tread measuring apparatus to protect the tread measuring apparatus.

8. The tread depth measuring system of claim 7, wherein the protective cover is transparent.

9. A tread depth measuring system comprising:
   a support table comprising:
      a first ramp,
      a support portion defining a cavity, and
      a second ramp, wherein the first ramp and the second ramp positioned at opposite sides of the support portion;
   a three-dimensional camera received in the cavity;
   a three-dimensional graphics processor received in the cavity and coupled to the three-dimensional camera;
   a memory pre-storing a preset critical depth;
   a processor received in the cavity and coupled to the three-dimensional graphics processor and the memory, the processor configured to compare the tread depth measured by the three-dimensional camera with the preset critical depth;
   a supporter standing on ground;
   a warning apparatus supported by the supporter and coupled to the processor, and
   a sensor positioned on the ground and coupled to the tread measuring apparatus, the sensor being configured to sense a distance between the sensor and a tire of a car moving towards the sensor, and actuate the three-dimensional camera when the distance sensed by the sensor is less than a preset distance;
   wherein, when the tread depth measured by the tread measuring apparatus is less than the preset critical depth, the processor sends a first control signal to actuate the warning apparatus.

10. The tread depth measuring system of claim 9, wherein the warning apparatus comprises a signal light coupled to the supporter, when the tread depth measured by the tread measuring apparatus is less than the preset critical depth, the processor sends the first control signal to actuate the signal light.

11. The tread depth measuring system of claim 10, wherein when the tread depth measured by the tread measuring apparatus is less than the preset critical depth, the signal light turns red, the preset critical depth is 1.6 mm.

12. The tread depth measuring system of claim 9, wherein the warning apparatus comprises a signal light coupled to the supporter, the memory stores a preset reference depth, the processor is further configured to compare the tread depth measured by the tread measuring apparatus with the preset reference depth, when the tread depth measured by the tread measuring apparatus is larger than the preset reference depth, the processor sends a second control signal to actuate the signal light to turn green; when the tread depth measured by the tread measuring apparatus is larger than the preset critical depth and less than the preset reference depth, the processor sends a third control signal to actuate the signal light to turn yellow.

13. The tread depth measuring system of claim 12, wherein the preset reference depth is 1.9 mm.

14. The tread depth measuring system of claim 9, wherein the warning apparatus comprises a camera supported by the supporter, when the tread depth measured by the tread measuring apparatus is less than the preset critical depth, the processor controls the camera to take a picture of a license plate of a measured car.

15. The tread depth measuring system of claim 9, wherein the three-dimensional graphics processor is configured to analyze the tread depth from a picture taken by the three-dimensional camera.

16. The tread depth measuring system of claim 9, wherein the support table further defines a hole in communication with the cavity.

17. The tread depth measuring system of claim 9, wherein the support table is substantially trapezoidal.

\* \* \* \* \*